United States Patent

Oh et al.

(10) Patent No.: US 9,302,341 B2
(45) Date of Patent: Apr. 5, 2016

(54) WELDING CONTACT TIP WITH CONDUCTIVE BRUSH

(75) Inventors: Hieyoung W. Oh, Bowdoin, ME (US); Adam H. Willwerth, North Yarmouth, ME (US); Jeffrey W. Richardson, Otisfield, ME (US); Kenneth S. Dobson, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 2494 days.

(21) Appl. No.: 12/098,926

(22) Filed: Apr. 7, 2008

(65) Prior Publication Data

US 2008/0272101 A1 Nov. 6, 2008

Related U.S. Application Data

(60) Provisional application No. 60/927,348, filed on May 3, 2007.

(51) Int. Cl.
| | | |
|---|---|---|
| *B23K 9/28* | (2006.01) | |
| *B23K 9/173* | (2006.01) | |
| *B23K 9/26* | (2006.01) | |
| *B23K 9/29* | (2006.01) | |
| *H01R 39/24* | (2006.01) | |
| *H01R 13/33* | (2006.01) | |

(52) U.S. Cl.
CPC . *B23K 9/173* (2013.01); *B23K 9/26* (2013.01); *B23K 9/29* (2013.01); *H01R 39/24* (2013.01); *H01R 13/33* (2013.01); *Y10T 29/49904* (2015.01)

(58) Field of Classification Search
USPC ............. 219/137.42, 137.31, 137.71, 136, 219/137.61, 162; 29/469
See application file for complete search history.

(56) References Cited

U.S. PATENT DOCUMENTS

| | | | |
|---|---|---|---|
| 2,931,890 A * | 4/1960 | Bernard | 219/137.7 |
| 3,576,423 A | 4/1971 | Bernard | |
| 4,075,523 A | 2/1978 | Lafferty et al. | |
| 4,358,699 A * | 11/1982 | Wilsdorf | 310/251 |
| 4,956,541 A | 9/1990 | Hiltunen | |
| 5,380,980 A | 1/1995 | Colling | |
| 5,384,444 A | 1/1995 | Truty et al. | |
| 5,440,100 A | 8/1995 | Stuart et al. | |
| 5,488,217 A * | 1/1996 | Ni | 219/137.31 |
| 5,501,899 A | 3/1996 | Larkin | |
| 5,599,615 A * | 2/1997 | Swift et al. | 428/293.1 |
| 5,635,090 A | 6/1997 | Lubieniecki | |
| 5,635,091 A | 6/1997 | Hori et al. | |
| 5,726,420 A | 3/1998 | Lajoie | |

(Continued)

FOREIGN PATENT DOCUMENTS

| | | | | |
|---|---|---|---|---|
| JP | 08-150479 | * | 6/1996 | B23K 9/26 |
| JP | 10193122 | | 6/1996 | |

(Continued)

*Primary Examiner* — Thien S Tran
(74) *Attorney, Agent, or Firm* — Fletcher Yoder, P.C.

(57) ABSTRACT

A contact tip is provided for wire welding applications. The contact tip includes one or more conductive brushes fitted to a conductive contact tip body. Fibers of the brush extend into a passageway traversed by welding wire in operation. Electrical current is transmitted to the brush assembly and through the brush fibers to the welding wire. The fibers may transmit the current directly and also may enhance contact of the welding wire with one or more walls of the contact tip. Improved electrical contact and weld quality are obtained.

19 Claims, 3 Drawing Sheets

(56) References Cited

U.S. PATENT DOCUMENTS

| | | |
|---|---|---|
| 5,760,373 A | 6/1998 | Colling |
| 5,911,894 A | 6/1999 | Colling |
| 6,075,227 A | 6/2000 | Lajoie |
| 6,245,440 B1 | 6/2001 | Kuhlmann-Wilsdorf et al. |
| 6,414,584 B1 | 7/2002 | Liu et al. |
| 6,559,416 B1 | 5/2003 | Steenis et al. |
| 6,627,834 B1 | 9/2003 | Moro et al. |
| 6,669,202 B1 * | 12/2003 | Aksit et al. .................... 277/355 |
| 6,689,987 B2 | 2/2004 | Altekruse et al. |
| 6,710,300 B2 | 3/2004 | Steenis et al. |
| 6,924,461 B2 | 8/2005 | Matiash |
| 7,094,990 B2 * | 8/2006 | Taaler ...................... 219/137.61 |
| 7,105,775 B2 | 9/2006 | Giese |
| 7,119,303 B2 | 10/2006 | Somerkoski |
| 7,136,271 B2 | 11/2006 | Oh et al. |
| 7,193,836 B2 | 3/2007 | Oh et al. |
| 2002/0088787 A1 | 7/2002 | Ziegler et al. |
| 2006/0151453 A1 * | 7/2006 | Gordon et al. ........... 219/137.61 |

FOREIGN PATENT DOCUMENTS

| | | |
|---|---|---|
| JP | 10193122 | 7/1998 |
| JP | 2002263846 | 9/2002 |
| WO | 87/00470 | 1/1987 |
| WO | 99/65635 | 12/1999 |
| WO | 03/039800 | 5/2003 |
| WO | 03/095134 | 11/2003 |

* cited by examiner

WELDING CONTACT TIP WITH CONDUCTIVE BRUSH

CROSS REFERENCE TO RELATED APPLICATIONS

This application is a Non-Provisional Application of U.S. Provisional Patent Application No. 60/927,348, entitled "WELDING CONTACT TIP WITH CONDUCTIVE MICROFIBER BRUSH", filed May 3, 2007, which is herein incorporated by reference.

BACKGROUND

The present invention relates generally to contact tips for welding applications.

A range of welding applications and apparatus are known in the field, typically adapted for a particular type of welding operation. For example, in one operation commonly referred to as metal inert gas (MIG) welding, a wire is fed from a spool through a welding torch. An electrical charge is placed on the wire via the torch and, as the wire makes contact with a grounded workpiece, an arc is formed. The arc heats the workpiece as well as the wire, melting the weld location and adding the wire to the weldment. In many such applications, a shielding gas is applied via the torch that at least partially surrounds a progressive weld pool to aide in the formation of the weld and to protect the weld during solidification of the molten metal.

Various other arrangements and applications exist for wire feed welders. In general, these function similar to the MIG systems described above, but may include wires with a composite structure made of a sheath surrounding a filler material, often disposed in the sheath in a form of a metal powder. Such wires may also include flux cores with materials that protect the weld in lieu of a shielding gas.

In all of these wire feed welding techniques, a persistent problem exists in maintaining good electrical contact between the wire and the charged portions of the torch. That is, the torch typically includes a series of electrically coupled conductive elements that convey charge to the wire as it passes through the torch. One of these elements is a contact tip, the function of which is to transmit electrical current from the torch to the passing wire. However, because the wire must generally freely pass through the torch as it is driven by a motor and drive mechanism from a spool, less than optimal contact may be made at certain points in the operation. If contact is lost or even temporarily interrupted between the contact tip and the wire, a degraded weld may result, particularly from interrupted or sporadic arcs, re-arcing, less than optimal arcs, and so forth.

Various arrangements have been devised in attempts to maintain improved contact between elements of welding torches and welding wire. However, these have yet to provide highly reliable contact mechanisms in a range of conditions. Moreover, because certain components of the torch, such as the contact tip, may need to be changed from time to time as they wear or are degraded (such as by weld sputter), certain proposed mechanisms in the art that are not well-suited to the actual conditions present in welding applications or such easy change-out are simply not practical.

There is a need, therefore, for improved technique for maintaining good electrical contact between a charged welding torch or components of a welding torch and welding wire.

BRIEF DESCRIPTION

The present invention provides a novel approach to this problem designed to resolve certain of these drawbacks in the art. In particularly, the invention provides a contact tip that includes a conductive brush that transmits electrical charge to a welding wire fed through the contact tip. The brush may be inserted in a side aperture of the contact tip and may extend into a pathway traversed by the wire during operation. The brush may transmit electric current to the welding wire directly, but may also urge the welding wire toward a sidewall of the contact tip, insuring even greater electrical contact as the wire traverses the tip. In certain embodiments, more than one such brush may be employed, and these may extend into the passage of the welding wire from different positions around the contact tip. The contact tip may be adapted to conform to a conventional shape or form factor so that it may simply replace existing contact tips already in the field to improve existing welding systems by retrofit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
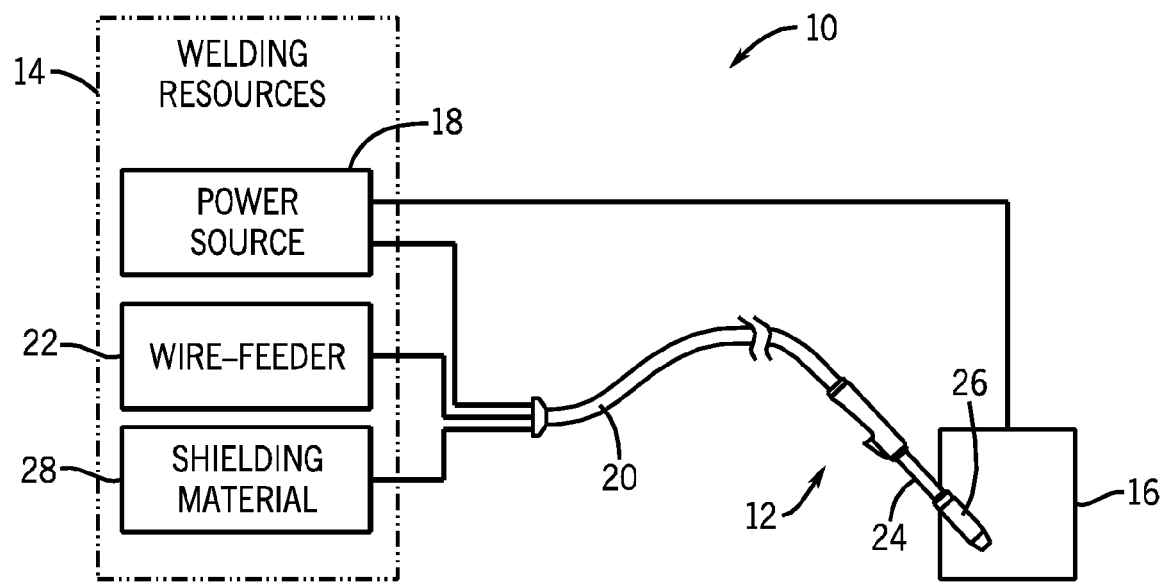
FIG. 1 is a diagrammatical overview of an exemplary wire welding system including a contact tip in accordance with aspects of the present invention.

FIG. 1 illustrates an exemplary wire-feed welding system 10 that incorporates a contact tip in accordance with aspects of the invention. The exemplary welding system 10 includes a welding torch 12 and one or more welding resources 14 that may be utilized to perform a welding operation on a workpiece 16. Placement of the welding torch 12 at a location proximate to the workpiece 16 allows electrical current, which is provided by a power source 18 and routed to the welding torch 12 via a welding cable 20, to arc from the welding torch 12 to the workpiece 16. In summary, this arcing completes an electrical circuit that includes the power source 18, the welding torch 12, and the workpiece 16. Particularly, inoperation, current passes from the power source 18, to the welding torch 12 via the welding cable 20, to a wire electrode (see, e.g., FIG. 5), to the workpiece 16, which is typically grounded. This arcing generates a relatively large amount of heat that causes the workpiece 16 and/or filler metal of the welding wire to transition to a molten state, thereby forming the weld.

In addition to the power source 18, the welding resources 14 may include a wire feeder 22 that provides a consumable wire electrode (such as wire 70 shown in FIG. 5), through the welding cable 20 to the welding torch 12. A wide array of wire electrodes may be used in accordance with the present techniques, including traditional wire electrodes or gasless wire electrodes. As discussed further below, the welding torch 12 conducts electrical current to the wire electrode via a contact tip located in a neck assembly 24 and supported by a securing member or nozzle 26 to facilitate arcing between the egressing wire electrode and the workpiece 16.

To shield the weld area from contaminants during welding, to enhance arc performance, and to improve the resulting weld, the exemplary system 10 includes a shielding material source 28 that feeds an inert shielding gas to the welding torch 12 via the welding cable 20. It is worth noting, however, that a variety of shielding materials for protecting the weld location may be employed in addition to, or in place of, the inert shielding gas, including active gases, various fluids, and particulate solids. Further, other embodiments, such as those employing gasless wire electrodes, may not greatly benefit from a shielding material and, accordingly, may or may not include the shielding material source 28.

Figure 2:
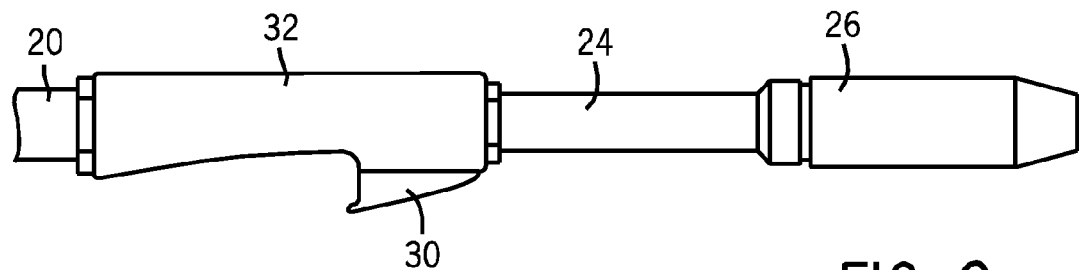
FIG. 2 is a side elevation view of an exemplary welding torch including the inventive contact tip.

Referring to an exemplary embodiment of the welding torch, illustrated in FIG. 2, advancement of these welding resources (e.g., welding current, wire electrode, and shielding gas) is effectuated by actuation of a trigger 30 secured to a handle 32 of the welding torch 12. By depressing the trigger 30 of the exemplary welding torch 12, a switch (not shown) disposed within the trigger is closed, causing the transmission of an electrical signal that commands delivery of the welding resources into the welding cable 20 and to the neck assembly 24.

Figure 3:
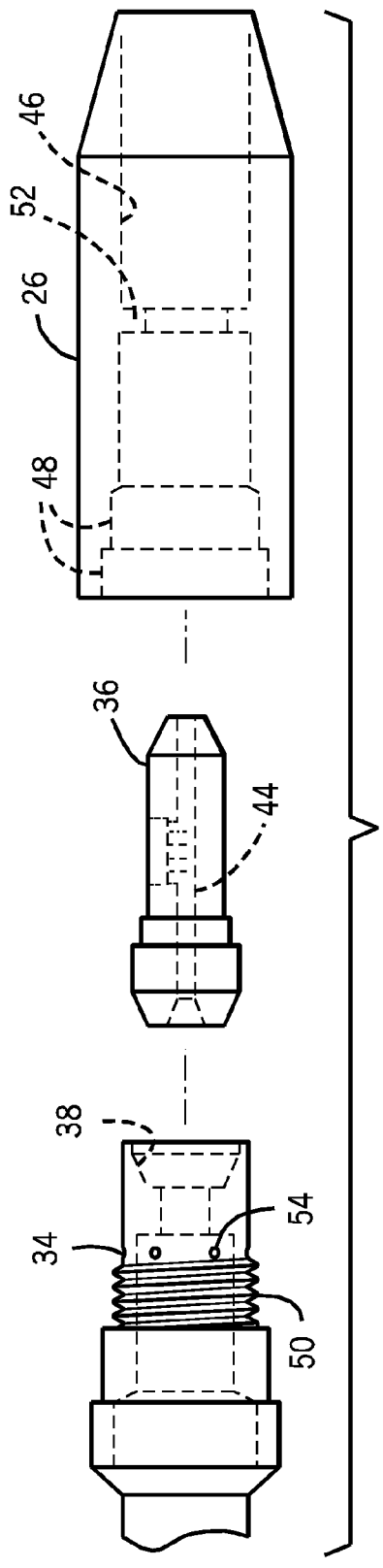
FIG. 3 is an exploded view of the end of the torch of FIG. 2 illustrating the contact tip in place between the torch neck assembly and the torch nozzle.

Turning to FIG. 3, an exemplary torch assembly is shown, including a contact tip along with other torch components. Notably, the assembly includes a diffuser 34, a contact tip 36, and the nozzle 26. In the exemplary welding system, the diffuser 34 operates to receive the welding current, the wire electrode, and the shielding material. A generally conical seating location 38 of the diffuser 34 corresponds with a mating surface 40 of the contact tip 36, thereby facilitating the centering and engagement of the contact tip 36 with the diffuser 34. A shoulder 42 is also formed on the contact tip adjacent to the mating surface 40 for aide in centering the contact tip within the fuser 34 and the nozzle 26. A wire path 44 extends through the contact tip and accommodates the welding wire as described in greater detail below. It also describes below, a conductive brush extends into this path 44 for aide in transmitting electrical current from the contact tip to the welding wire. A channel or bore 46 is formed in the nozzle 26 and at least partially surrounds the contact tip during operation. The channel and the surrounding nozzle help to guard the contact tip from weld splatter and damage during operation. On an opposite end of the nozzle, a seating surface 48 is formed for receiving the diffuser 34 which, in the illustrated embodiment, is threaded into the nozzle. The illustrated diffuser has a threaded portion 50 that is received in the nozzle for both attaching the nozzle to the diffuser and for capturing the contact tip therebetween. An internal shoulder 52 within the nozzle surrounds the shoulder 42 of the contact tip and further aides in the maintaining the contact tip in alignment and contact with both the diffuser and the nozzle. In operation, welding gas may be transmitted from the diffuser 34 through openings or channels 54 and around the contact tip, through the nozzle to shield welds made by advancing wire fed through the assembly.

Figure 4:
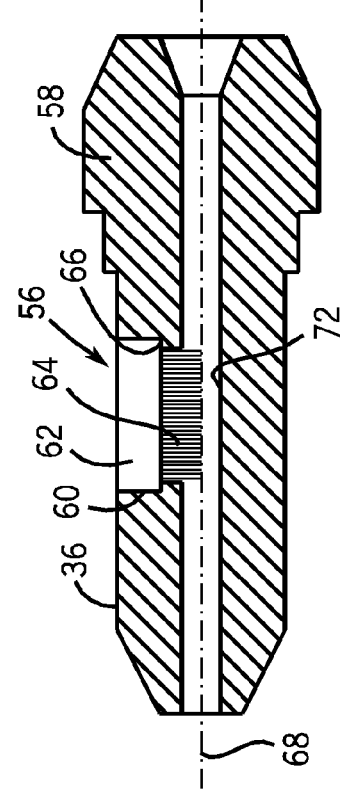
FIG. 4 is a partial sectional view through the contact tip, illustrating a conductive brush disposed in the contact tip for maintaining good contact with a welding wire.

FIG. 4 is a partial sectional view of the contact tip 36 with a conductive brush 56 installed in the contact tip body 58. As noted above, the body may be contoured and formed to fit within and be retained by the other components of the torch. Any conventional or new shape of contact tip may be accommodated, and the body may be shaped to conform to existing designs, making the contact tip completely retrofitable for improving existing welding torches. Again, the body itself is made of a conductive material, such as copper. In the illustrated embodiment, a side aperture 60 is formed and the brush 56 is disposed in the side aperture. The aperture may be of any form, such as rectangular, oblong, circular, oval, and so forth. In general, the aperture will conform to the outer perimeter configuration of the brush.

The brush itself includes a holder 62 and a collection of fibers or microfibers 64 held by the holder and extending from the holder through the contact tip sidewall. In a presently contemplated embodiment, the holder may be made of a conductive material such as copper. The microfibers of the brush may be made of any suitable material, such as metal, high temperature plastic, carbon fiber, and so forth. In a presently contemplated embodiment, shoulders 66 are formed in the side aperture 60 and the holder 62 is press-fit into the side aperture until it reaches a final position adjacent to the shoulders. The shoulders keep the brush from protruding further into the aperture and appropriately locate the brush in the contact tip. The holder or the contact tip body, or both, may then be slightly deformed or staked to hold the brush in place. Alternatively, a liquid silver or high temperature solder or weld may be provided to maintain the brush in place in the contact tip. The microfibers themselves may be of any suitable dimensions, with presently contemplated microfibers being between 7 and 150 microns in diameter. Fibers with smaller diameters may provide enhanced performance, such as fibers below about 50 microns in diameter. The microfibers will extend into the passageway through the contact tip. In a presently contemplated embodiment, for example, the microfibers extend approximately to the center line 68 of the passageway through the contact tip, although different extensions may be envisaged.

Figure 5:
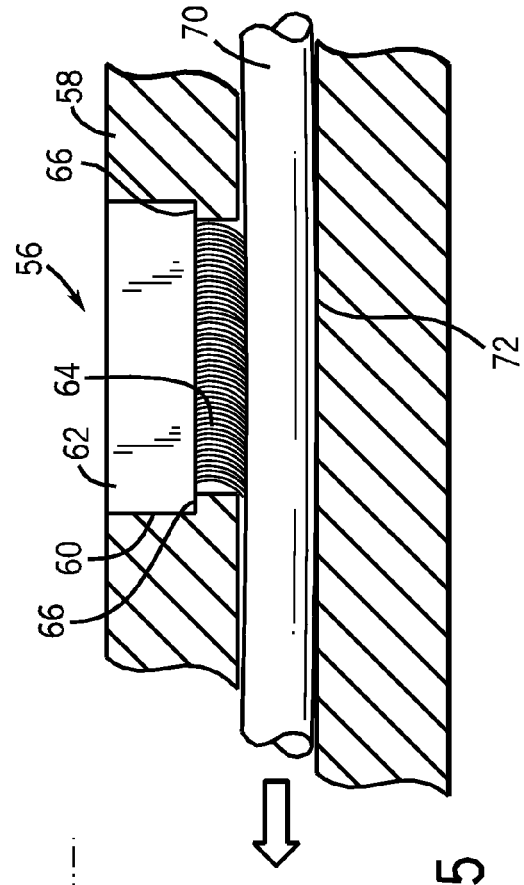
FIG. 5 is a more detailed view of the brush of FIG. 4 in the contact tip, in contact with a welding wire traversing the contact tip during operation.

FIG. 5 illustrates these structures in operation. In the illustration of FIG. 5, a welding wire 70 is being advanced through the contact tip. The passageway through a contact tip is intentionally somewhat larger than the wire to allow the wire to advance relatively freely through the contact tip as it is fed by the wire-feed system. The fibers 64 of the brush 56 contact the wire 70 and pass current from the contact tip body to the wire. Moreover, in the illustrated embodiment, the fibers may exert a lateral force on the wire that drives the wire toward an opposite wall 72 of the contact tip. Both direct contact with the microfibers and enhanced contact with the sidewall of the contact tip improve the transmission of electrical current to the wire. However, it should be noted that sufficient electrical current may be transmitted to the wire by one or more brushes alone, although the additional transmission from the sidewall is contemplated in a present embodiment.

Figure 6:
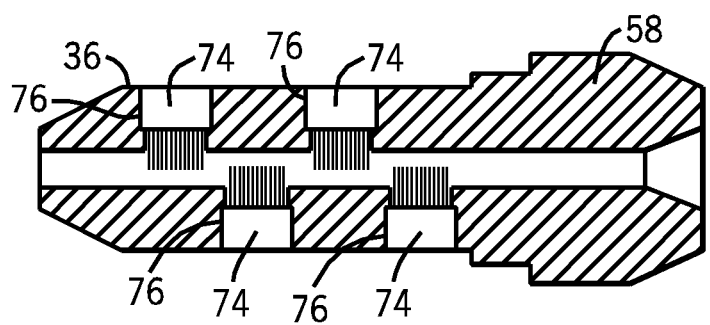
FIG. 6 is a partial sectional view of an alternative configuration for the contact tip including a plurality of conductive brushes.

FIG. 6 illustrates an alternative configuration of the contact tip in which a plurality of brushes 74 are provided at different locations along the contact tip. As in the previous embodiment, the contact tip body has apertures 76 formed therein with shoulders that appropriately position the brushes. The brushes may again be press-fit, staked, or otherwise held in place in the contact tip. The fibers from each brush again extend into the passageway through which the welding wire passes during welding operations. Where multiple brushes are used, these may be placed in a line along the wall of the contact tip, in diametrically opposite locations (as shown in FIG. 6) or at different radial positions around the wire passageway.

Figure 7:
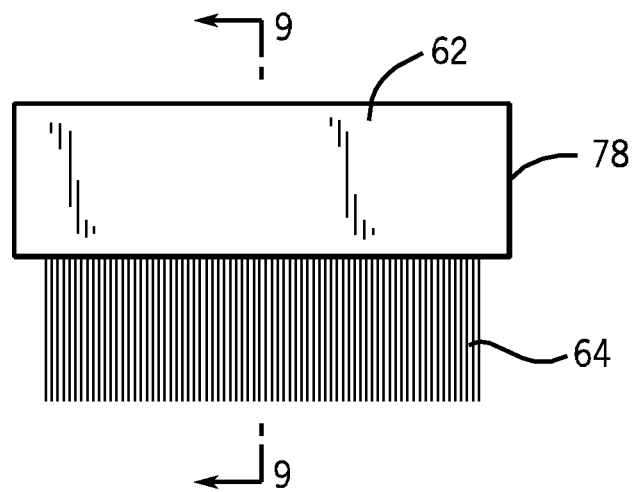
FIG. 7 is an elevational view of a brush insert of the type that may be used in the contact tips illustrated in the previous figures.
Figure 8:
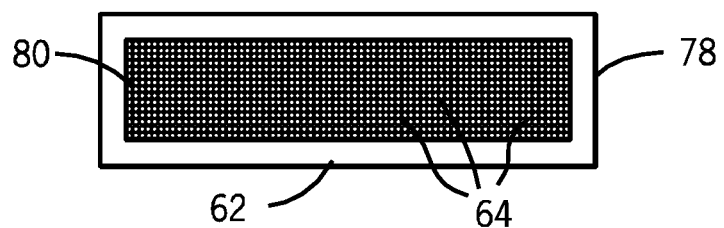
FIG. 8 is top view of the brush insert of FIG. 7.
Figure 9:
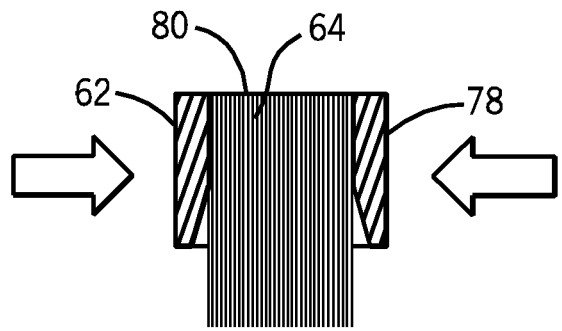
FIG. 9 is a sectional view through the brush insert of FIG. 7 taken along line 9-9.

FIGS. 7, 8 and 9 illustrate a presently contemplated configuration for a brush insert 78 that can be used for the brushes described above. While the elongated configuration shown in these figures is presently contemplated, and generally conforms to the embodiment illustrated in FIG. 4, other configurations, such as generally square, round, oval, elongated, and so forth may be envisaged. As illustrated in FIG. 7, the holder 62 may be formed of a casing that is disposed around the fibers 64. The holder casing may be made of a conductive material, such as copper. As best shown in top view of FIG. 8, a central opening 80 is thus formed in the holder and the fibers 64 may be placed in this opening. The holder may then be compressed or crimped as illustrated by the arrows in FIG. 9 to capture the fibers between side and end panels of the holder. In a presently contemplated embodiment such crimping is sufficient to maintain the fibers in place and to maintain good electrical contact between the holder and the fibers. Alternatively, however, conductive boding materials, solders, and the like may be used either between the fibers or between the holder and the fibers, as well as on top of the fibers, where desired.

The arrangements described above have been found to provide extremely effective contact between the contact tip and welding wire. The arrangements exhibit negligible wear and operate for long periods, maintenance free. It is estimated that the contact tips described above may provide several times the life expectancy of conventional contact tips that they may replace. Moreover, the contact tips provide for much better electrical contact and, consequently, better weld quality. Moreover, where desired, the same contact tip may be used for multiple wire sizes owing to the extension of the fibers into the passageway of the contact tip. As will be appreciated by those skilled in the art, this might alleviates the need to change the contact tip when different wire sizes are employed as is the case with conventional contact tips.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding contact tip comprising:
   a conductive body configured to be secured within a welding torch and to receive a welding wire through a longitudinal aperture formed through the body; and
   a conductive brush having fibers extending into the longitudinal aperture and configured to transmit electrical current to the welding wire in operation;
   wherein the fibers are configured to exert a lateral force on the welding wire to drive the welding wire into electrical contact with the longitudinal aperture.

2. The contact tip of claim 1, comprising a plurality of brushes disposed at different locations lengthwise along the aperture.

3. The contact tip of claim 2, wherein the brushes are disposed at different radial locations with respect to a centerline of the body.

4. The contact tip of claim 1, wherein body includes a side aperture in communication with the longitudinal aperture, and wherein the brush is disposed in the side aperture.

5. The contact tip of claim 3, wherein the side aperture includes a shoulder, and wherein the brush includes a fiber support that contacts the shoulder to position the brush in the body.

6. The contact tip of claim 1, wherein the brush includes a fiber support made of a conductive material.

7. The contact tip of claim 6, wherein the conductive material is copper.

8. The contact tip of claim 1, wherein the fibers are made of a conductive metal, a conductive plastic or carbon fiber.

9. The contact tip of claim 1, wherein the fibers have a thickness of between 7 and 150 microns.

10. The contact tip of claim 9, wherein the fibers have a thickness below about 50 microns.

11. A method for making a welding device comprising:
    forming a contact tip body including an outer mounting surface and a longitudinal aperture extending through the body; and
    disposing a conductive brush in the body, the brush having fibers extending into the longitudinal aperture and configured to transmit electrical current to a welding wire fed through the longitudinal aperture in operation;
    wherein the fibers are configured to exert a lateral force on the welding wire to drive the welding wire into electrical contact with the longitudinal aperture.

12. The method of claim 11, comprising forming a side aperture in the body, the side aperture communicating with the longitudinal aperture, wherein the brush is disposed in the side aperture.

13. The method of claim 12, comprising forming a shoulder in the side aperture, the shoulder appropriately locating the brush in the side aperture.

14. The method of claim 11, comprising disposing a plurality of brushes in the body, fibers of each brush extending into the longitudinal aperture.

15. The method of claim 11, comprising installing the contact tip body in a welding torch.

16. A method for using a welding device comprising:
    applying electrical power to a welding torch;
    feeding a welding wire through the torch; and
    transmitting the electrical current to the welding wire via conductive fibers of a brush disposed in a path of the welding wire through the torch;
    wherein the brush is disposed in a contact tip disposed in the welding torch, the contact tip includes a longitudinal aperture through which the welding wire is fed, and the fibers are configured to exert a lateral force on the welding wire to drive the welding wire into electrical contact with the longitudinal aperture.

17. The method of claim 16, wherein the brush transmits electrical current to the welding wire by contacting the welding wire with fibers of the brush in the contact tip.

18. The method of claim 17, wherein the electrical current is transmitted to the welding wire by contacting the welding wire with fibers of a plurality of brushes in the contact tip.

19. The method of claim 16, wherein current is also transmitted to the welding wire by contact of the welding wire with the longitudinal aperture of the contact tip.

* * * * *